United States Patent
Cristea et al.

[19]

[11] Patent Number: 5,810,034
[45] Date of Patent: Sep. 22, 1998

[54] BALANCED ROTARY AIR MANIFOLD

[75] Inventors: Corneliu Cristea, North Mankato; Tim A. Dahm, Mankato, both of Minn.

[73] Assignee: V-Tek Incorporated, Mankato, Minn.

[21] Appl. No.: 946,404

[22] Filed: Oct. 7, 1997

Related U.S. Application Data

[63] Continuation of Ser. No. 748,693, Nov. 13, 1996, abandoned.

[51] Int. Cl.$^6$ ....................................................... E03B 1/00
[52] U.S. Cl. ........................................... 137/580; 285/136
[58] Field of Search ............................. 137/580; 285/134, 285/136

[56] References Cited

U.S. PATENT DOCUMENTS

| | | | |
|---|---|---|---|
| 2,825,463 | 3/1958 | Thomas | 285/134 |
| 3,443,747 | 5/1969 | Jacobson et al. | 285/134 |
| 4,214,780 | 7/1980 | Grace | 285/134 |
| 4,377,253 | 3/1983 | Bruneel | 285/134 |
| 4,405,162 | 9/1983 | Williams | 285/136 |
| 4,683,912 | 8/1987 | Dubrosky | 137/580 |
| 4,749,335 | 6/1988 | Brandt et al. | 137/580 |
| 5,462,083 | 10/1995 | Kaspar | 285/136 |

OTHER PUBLICATIONS

Specification sheet for the TM–6000SMD Automatic Taping Machine manufactured and sold by V–TEK Incorporated.

Primary Examiner—Denise L. Ferensic
Assistant Examiner—Joanne Y. Kim
Attorney, Agent, or Firm—Craig J. Lervick

[57] ABSTRACT

A balanced rotary manifold is disclosed which is capable of carrying a plurality of control signals from a control housing to an outlet port on a rotatable structure. These control signals can then be appropriately transmitted to further devices which are mounted to the rotatable structure. The rotatable manifold structure is balanced in that all outlet ports are closely positioned and symmetric with regard to some desired reference point. Therefore, uniform lengths of connecting cable can be utilized to transmit the control signals to the actuating devices.

23 Claims, 3 Drawing Sheets

BALANCED ROTARY AIR MANIFOLD

This is a continuation of prior application Ser. No. 08/748,693, filed Nov. 13, 1996, now abandoned.

BACKGROUND OF THE INVENTION

The present invention relates to a device for transferring air pressure signals from a stationary housing to a rotatable fixture. More specifically, the present invention provides a mechanism whereby multiple signals can easily be transferred from the stationary housing to the rotatable fixture while still maintaining the independence of each specific signal. Furthermore, the present invention provides a balanced manifold for uniformly transferring signals without great differences in the distance traveled by each signal.

In the handling of small parts, it is often desirable to use pneumatic actuators to pick up and release parts. One such example is the handling of electronic components such as microchips. Generally, a nozzle assembly is placed in contact with the electronic part and a vacuum is created between the nozzle assembly and the part. Once such a vacuum is created, the nozzle will be able to hold and manipulate the part as desired. In most cases, such manipulation includes the moving and appropriate placement of the part, whether to place the part in appropriate packaging or to place the part in another fixture of some type.

In the creation of multifunction automated devices, it is often necessary to move parts between numerous locations. For example, it may be desirable to pick up a part from a supply source and move that part to a test fixture for some type of acceptance testing. Based upon the test results, the part can then be appropriately rejected or placed in a desired package. One way to accomplish these multiple functions is to configure all the appropriate "positions" around a rotatable fixture. In this way, nozzles or holding devices can be attached to the rotatable fixture and then appropriately rotated such that the part can be picked up at one position, can be tested at a second position, can be rejected at a third position, and could be placed at a fourth position (such as in a desired package). An example of such a device carrying out these functions is the component packaging and testing device Model No. TM6000 manufactured and sold by V-TEK Incorporated of Mankato, Minn.

One challenge in the design of such multifunction devices is to appropriately transfer the control signals to the rotatable fixture. Often, such control signals are pneumatic or hydraulic. These signals are difficult to transfer to a rotatable structure without losing the integrity of the signals. Furthermore, it is often difficult to maintain the independence of these control signals.

In some prior solutions, mechanisms are provided with long cables or hoses. This configuration allowed rotation; however, the rotatable structure was somewhat restricted. These mechanisms are driven such that the hoses or cabling are allowed to wrap around the device for a predetermined number of turns. Once "wound" to a predetermined level, the rotatable structure is reversed to unwind. So long as the device is given 360 degrees of rotational freedom, all functions can be accomplished through this forward and reverse operation. Such a mode of operation is very undesirable, however, due to the physical limitations placed on the device.

As will be understood by those skilled in the art, operating a precision device in both forward and reverse modes creates many undesired problems. For example, alignment and calibration can be affected every time the device reverses direction. If an abrupt turnaround is required, certain belts or connectors can be jarred, thus causing inaccurate alignment. Furthermore, allowing hoses or cabling to wrap around the device and then reversing to unwind is an undesirable mode of operation as these hoses can be destroyed if not operated correctly.

Another solution to the problem of transferring control signals is to create a rotatable air handling device which also maintains the integrity of the desired signals. Referring to FIGS. 1 and 2, there is shown one prior art device for accomplishing the transfer of control signals to a rotatable structure. FIG. 1 is a top view of a rotatable turret which is used for the handling and movement of piece parts. FIG. 2 is a partial cross-section of the same device.

Referring specifically to FIG. 1, there is shown a rotatable turret 10 having four nozzle assemblies 12 attached thereto. Each nozzle assembly 12 is attached to a nozzle mount structure 14 such that the four nozzles surround a central axis or shaft 16. Also, surrounding central shaft 16 is a four port manifold structure 18. On the top surface of this manifold structure there are four separate inlet ports 20 which, in operation, are attached to signal control devices. These ports are used to transmit appropriate signals to their respective nozzle assemblies. Also shown in FIG. 1 are a plurality of communication links 22 (or air hoses) for communicating appropriate signals to each nozzle assembly 12.

In operation, signals are produced by control mechanisms (not shown in FIGS. 1 and 2) which must be transmitted to the appropriate nozzle assembly. These signals control the operation of the respective nozzle. The source of such signals is attached to inlet ports 20, The signal is then communicated through the four port manifold structure 18 and to each nozzle assembly 12 via the respective communication link 22. As will be more fully seen by referring to FIG. 2, each communication link 22 is attached to a manifold outer member (not shown in FIG. 1) and is not necessarily attached to the four port manifold structure 18. This configuration allows the nozzle mount structure 14 (and all associated devices) to freely rotate around central shaft 16 while also handling the independent air signals.

The device of FIG. 1 can be more fully understood by referring to FIG. 2 which is a cross-section of the rotatable turret device 10 along section line 2—2. (For completeness, the drawing of FIG. 1 is shown from the perspective of section line 1—1 in FIG. 2.)

Referring to FIG. 2, there is shown nozzle mount structure 14, central shaft 16, four port manifold structure 18, and communication links 22. There is also shown a portion of the control housing 28 used in conjunction with the present invention. Control housing 28 generally contains all signal generators and control mechanisms to drive the nozzle assemblies. The nozzle control signals are created within control housing 28 and are transmitted to the housing exterior via connectors 26. Connectors 26 are configured such that hose pieces can be attached to either side thereof.

Shaft 16 is also attached to control housing 28 via a connection plate 30. As can be seen, a pair of signal communication links 32 (or hoses) also emanate from the bottom surface of control housing 28. Communication links 30 are attached to connectors 26. Each of these communication links 32 carry signals to inlet ports 20 of four port manifold structure 18. Four port manifold structure 18 is rigidly attached to shaft 16; therefore, communication links 32 easily attach and are not affected by any movement of devices.

Four port manifold structure 18 has a plurality of annular recesses 34 in an outer edge thereof. In the device of FIG. 2, four port manifold structure 18 has four (4) such annular manifold recesses 34. Within the body of manifold structure 18 there are chambers connecting each annular ring 34 with a single inlet port 20. Therefore, any signal presented at a respective inlet port 20 is communicated to a single annular ring. Surrounding the four port manifold structure is a manifold outer sleeve 40. Attached to the manifold outer sleeve 40 is nozzle mount structure 14 and a lower spindle 42. Each of these devices are rotatably attached to central shaft 16 via a plurality of bearings 44. In this fashion, the rotatable structure (spindle 42, nozzle mount structure 14 and manifold outer sleeve 40) are all free to rotate around central shaft 16 without any restriction.

As can be seen by the structure shown in FIG. 2, the distance required for the various signals to travel out of manifold outer sleeve 40 can vary greatly. The signal which is ported out of the upper annular recess has a longer distance to travel than the signal which is ported out of the lower most annular recess (since this signal must then be transmitted via hose down to the level of mounting structure 14). When a few signals are being utilized, this distance is somewhat inconsequential. However, when a greater number of signals is being communicated through manifold structure 18, the distances traveled can vary greatly due to the simple geometry required. It is desirable to have all outlet ports be positioned close to mounting structure 14 (thereby reducing the distance that signals must travel to reach the appropriate nozzle). Therefore, this type of manifold structure is undesirable when utilizing a larger number of air pressure signals. Furthermore, this structure is undesirable if the device is to be used in certain high-speed operations. When operating at high speed, it is critical for all outlet ports to be positioned close to the mounting structure. Such positioning allows for shorter communication links between the outlet ports and the nozzles. These shorter links insure efficient operation of the pneumatic system and lower mass necessary on the rotatable portion of the device.

SUMMARY OF THE INVENTION

The present invention provides an improved rotary manifold assembly which is capable of transmitting a large number of control signals from a plurality of inlet ports to a plurality of outlet ports. Each of the outlet ports are positioned on a rotary portion of the manifold assembly thus allowing any structure attached to these outlet ports to freely rotate without any restrictions. Furthermore, the manifold of the present invention is balanced such that there are not large variations in the distances that must be traveled by these control signals. In the preferred embodiment, all the signals are pneumatic; however, it is understood that hydraulic systems could also be used. Additionally, the manifold structure of the present invention is configured to have fewer parts thus easing assembly and reducing costs.

It is an object of the present invention to provide a balanced manifold structure for carrying a plurality of signals from an inlet port to an outlet port. Additionally, it is an object of the present invention to configure the manifold such that the outlet ports are positioned for fairly uniform access by numerous user devices.

DETAILED DESCRIPTION OF THE DRAWINGS

Further objects and advantages of the present invention can be seen from reading the following detailed description in conjunction with the drawings in which.

DETAILED DESCRIPTION OF THE INVENTION

Figure 1:
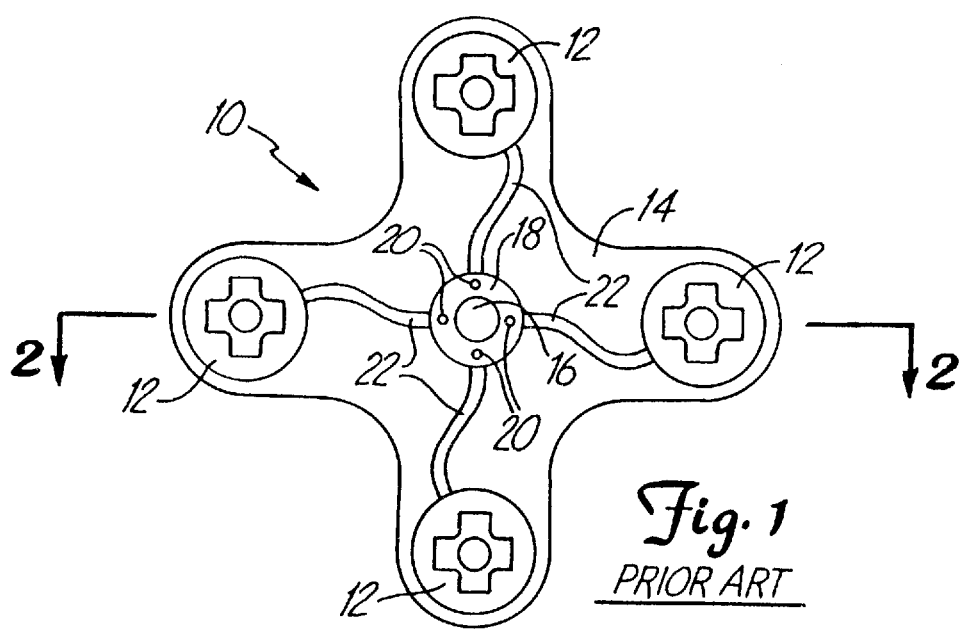
FIG. 1 is a top view of a prior art rotatable turret utilizing a prior art manifold.
Figure 2:
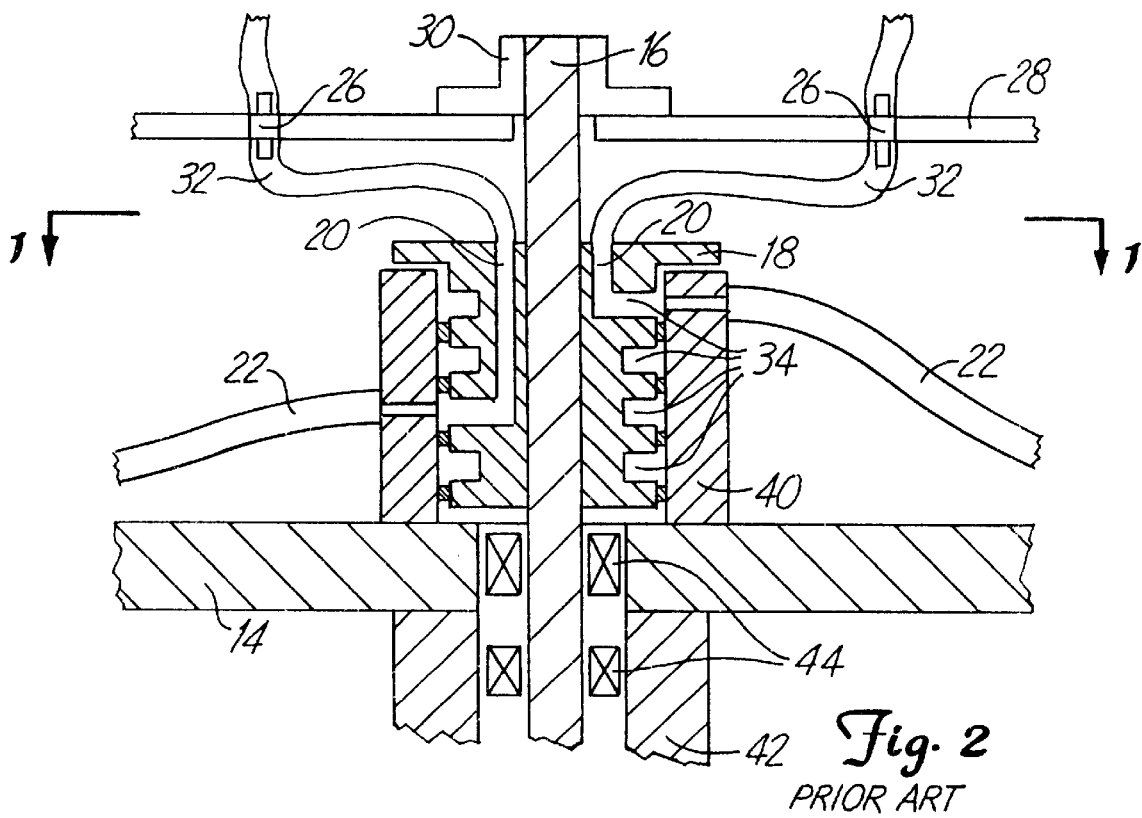
FIG. 2 is a cross-sectional diagram of a prior art manifold.
Figure 4:
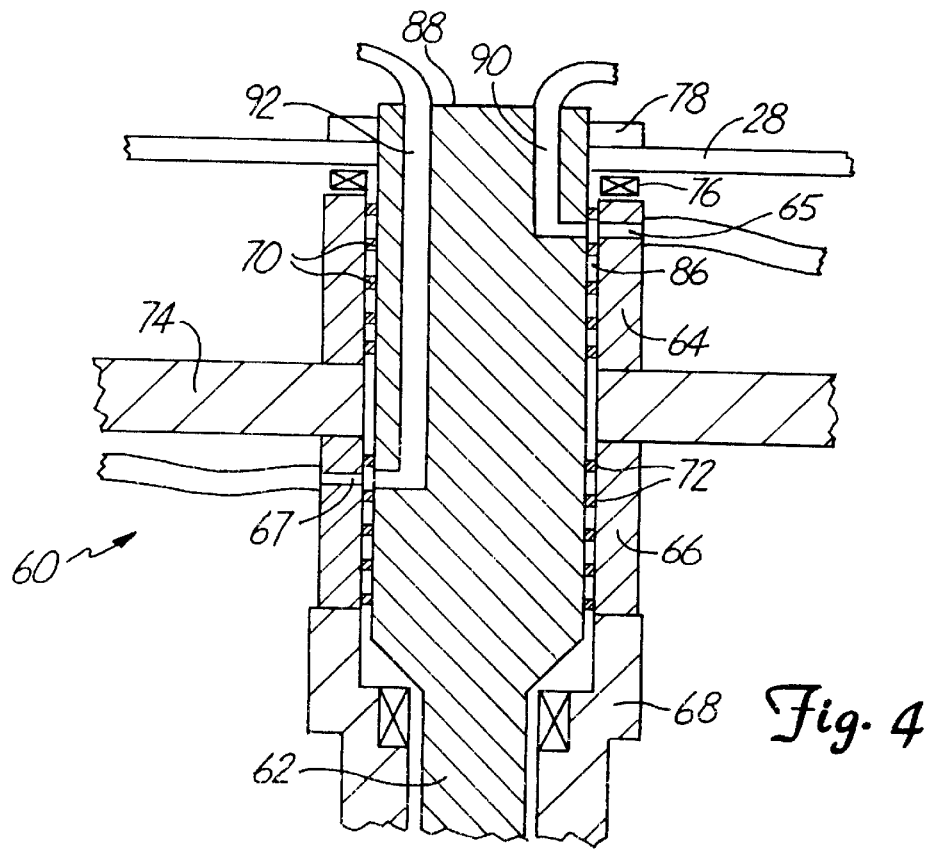
FIG. 4 is a cross-sectional diagram of the manifold of the present invention.
Figure 3:
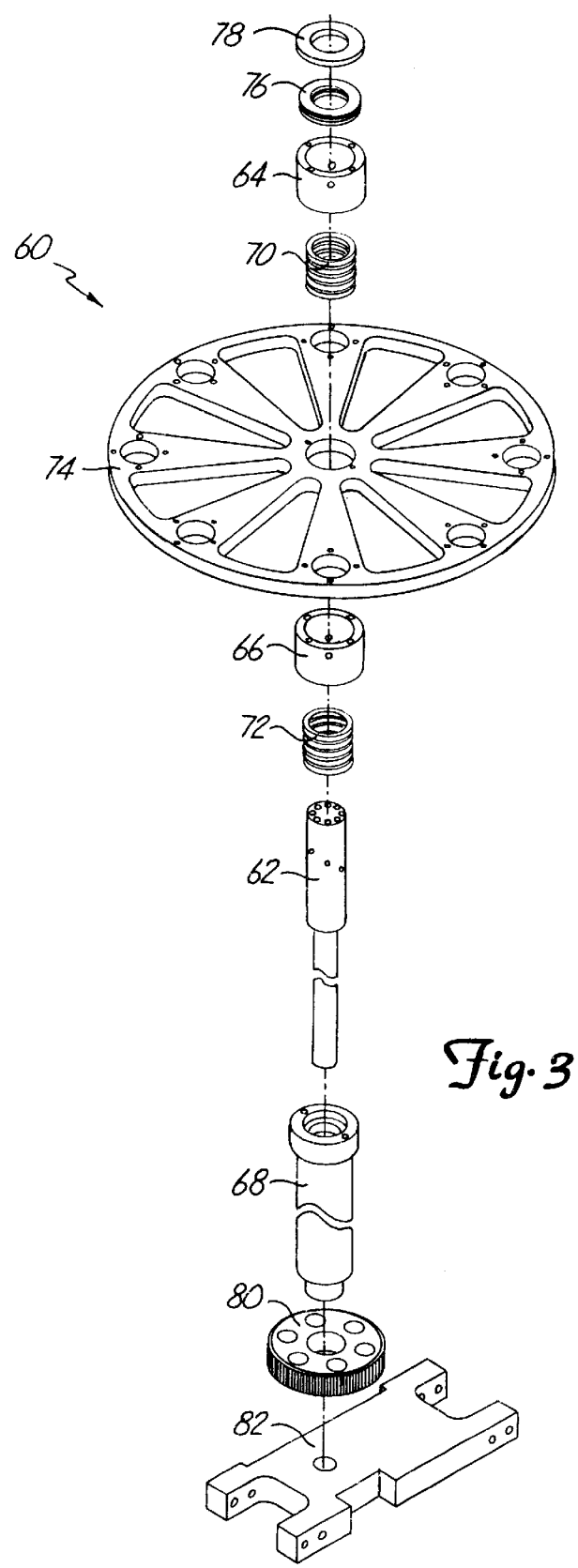
FIG. 3 is an exploded view of the manifold and turret structure of the present invention.

Referring now to FIGS. 3 and 4, there is shown the improved balanced manifold structure of the present invention. As will be seen, the structure is capable of carrying a large number of signals through a rotary manifold structure while maintaining relative balance between all the signals.

Referring now specifically to FIG. 3, there is shown the exploded view of an improved balanced manifold and turret assembly 60. This assembly includes a main shaft 62 about which all rotatable elements will rotate. The assembly also includes an upper outer spindle 64, a lower outer spindle 66 and an extension spindle 68. As will be further shown, each of these spindle elements are connected to one another and rotate about main shaft 62. Located between upper outer spindle 64 and main shaft 62 are a set of upper seals 70. Similarly, located between lower outer spindle 66 and main shaft 62 are a set of lower seals 72. Each set of seals (70 and 72) in combination with main shaft 62, upper outer spindle 64 and lower outer spindle 66 create the chambers necessary to transmit the independent control signals.

Located between the upper outer spindle 64 and the lower outer spindle 66 is a mounting structure or turret 74. In the preferred embodiment, turret 74 will house eight separate nozzle assemblies (not shown). Each nozzle assembly will operate to hold and manipulate parts as they are being rotated to different positions about the turret. As will be understood by those skilled in the art, each nozzle is capable of linear motion and of retaining parts through the creation of a vacuum. The nozzle is capable of descending its holding tip to contact the desired piece part, creating a vacuum to hold the specific piece part, and then appropriately lifting and/or manipulating the part. Each of these operations or functions are beneficial in the handling, testing and packaging of parts.

Also shown in FIG. 3 are a truss bearing 76, an end ring 78, a timing pulley 80 and a mounting fixture 82. Each of these parts accommodate or control the rotation of turret 74.

Referring now to FIG. 4 in which like parts are identified using like reference numbers. The structure shown easily allows the rotation of upper outer spindle 64, turret 74, lower outer spindle 66 and extension spindle 68 about the main shaft 62. Also shown in FIG. 4 is a portion of the control housing 28. In the preferred embodiment, this control housing 28 contains all the mechanisms to produce the appropriate control signals which are then transmitted to each nozzle. These control signals include all appropriate air pressure signals to drive each nozzle. Each control signal is independently controlled (thus allowing independent operation of each nozzle).

Two example signal paths are shown in FIG. 4. A first signal path 90 extends from an upper end 88 of main shaft 62 downwardly to a first point where the signal is then directed toward the outer surface 86 of the main shaft. As will be understood, such a communication path is easily achieved by drilling or boring into main shaft 62.

The point at which first signal path 90 exits main shaft 62 is positioned between two elements of upper seals 70. Upper outer spindle 64 also has an outlet port 65 positioned between the two elements of upper seals 70. Consequently, any control signal presented at the first signal path 90 is transmitted to outlet port 65.

It is noted that outlet port 65 is relatively close to the upper surface of turret 74. It is desired to keep all outlet ports (e.g. outlet port 65) in close proximity to the surfaces of turret 74 thereby eliminating large distances from which signals must be carried to reach the respective nozzles.

A second signal path 92 is also shown in FIG. 4. Second signal path 92 extends from an upper surface 88 of shaft 62 to a second point wherein the path is then directed toward the outer surface 86 of main shaft 62. Again, lower outer spindle 66 has an outlet port 67 associated with signal path 92. Outlet port 67 is again in close proximity to turret 74. It is understood that a plurality of signal paths and outlets exist which are identical to signal paths 90 and 92. This structure allows a plurality of independent control signals to be appropriately handled.

A number of small chambers are created between main shaft 62, upper outer spindle 64, and each of the seals 70. These chambers are in communication with the outlets from main shaft 62 and a transfer port in upper outer spindle 64. The same configuration is created by lower outer spindle 66 and lower seals 72. As can be seen from these drawings, these chambers and seals create paths which are capable of transferring a plurality of control signals through the manifold structure while also allowing unrestricted rotation of all rotatable members.

All control signals which are created in control housing 28 are presented to the manifold at upper surface 88 of main shaft 62. Since main shaft 62 is also mounted to the housing, it is convenient to present these signals while still inside control housing 28 without having to transfer through outer walls of the housing. This creates a unique and convenient mechanism for transferring control signals. Furthermore, main shaft 62 is a much less complicated device than that shown in the prior art. No annular recesses need be created in this part, as the seals in conjunction with the main shaft create all necessary structure to transfer the control signals. This creates a structure which is both easy to manufacture and economical while still achieving all desired functional characteristics. Furthermore, this structure is capable of keeping all outlet ports in close proximity to the turret 74. Therefore, great disparity in the lengths of the connecting tubes is eliminated.

Having illustrated and described the principles of the invention in the preferred embodiment, it should be apparent to those skilled in the art that the invention can be modified in arrangement and detail without departing from such principles. We claim all modifications coming within the scope and spirit of the following claims.

What is claimed is:

1. A balanced rotary manifold for transferring a plurality of signals from a housing to a rotatable fixture, the manifold comprising:

a main shaft having a plurality of shaft inlet ports for receiving the plurality of signals and a plurality of shaft outlet ports, the shaft inlet ports and the shaft outlet ports configured such that a single inlet port is in communication with at least one outlet port;

a spindle assembly rotatably associated with the main shaft having a first spindle portion and a second spindle portion, the first spindle having a plurality of first spindle ports, each first spindle port in communication with at least one shaft outlet port, the second spindle portion oriented opposite the first spindle portion, the second spindle portion having a plurality of second spindle ports, each second spindle port in communication with at least one shaft outlet port; and a mounting structure attached to the spindal assembly at a location substantially between the first spindle portion and the second spindle portion, such that the plurality of first spindle ports is located on a first side of the mounting structure and the plurality of second spindle ports is located on a second side of the mounting structure.

2. The balanced rotary air manifold of claim 1 wherein all of the plurality of signals are transferred by either the first outer spindle or the second outer spindle.

3. The balanced rotary air manifold of claim 1 further comprising a first seal set and a second seal set, the first seal set positioned between the first outer spindle and the main shaft so as to isolate each signal and the second seal set positioned between the second outer spindle and the main shaft to isolate each signal.

4. The balanced rotary air manifold of claim 3 wherein each shaft outlet port and a respective first spindle port or second spindle port are aligned in an opening of the first seal set or the second seal set.

5. The balanced rotary air manifold of claim 1 wherein the plurality of signals are each independent air pressure signals.

6. The balanced rotary air manifold of claim 1 wherein the plurality of signals include at least eight separate signals.

7. The balanced rotary air manifold of claim 1 further comprising a plurality of nozzles attached to the rotatable turret, each nozzle for receiving one of the plurality of signals.

8. The balance rotary air manifold of claim 1 further comprising a first bearing attached between the shaft and the first outer spindle, and a second bearing attached between the main shaft and the second outer spindle.

9. The balanced rotary air manifold of claim 1 wherein the main shaft is a substantially cylindrical member having an upper end surface perpendicular to the cylindrical axis and having a substantially cylindrical outer surface.

10. The balanced rotary air manifold of claim 9 wherein the shaft inlet ports are located on the upper end surface.

11. The balanced rotary air manifold of claim 10 wherein the shaft outlet ports are located on the substantially cylindrical outer surface, and each outlet port is in communication with each inlet port via a bore hole.

12. The manifold of claim 1 wherein the plurality of signals are pneumatic signals.

13. A balanced rotary manifold for use in transferring a plurality of signals which are generated at a housing to a plurality of handling devices which will utilize the plurality of signals, the balanced rotary air manifold capable of transferring the signals such that the distance traveled by the plurality of signals is balanced, the manifold comprising:

a main shaft having a plurality of shaft inlet ports for receiving the plurality of signals and a plurality of shaft outlet ports for presenting the plurality of signals to a plurality of predetermined locations, the shaft inlet ports and the shaft outlet ports configured such that a single inlet port is in communication with at least one outlet port;

a mounting structure rotatably associated with the main shaft;

a first outer spindle affixed to the mounting structure, the first outer spindle having a plurality of first spindle ports for transferring a first portion of the plurality signals to the mounting structure, each first spindle port in communication with at least one shaft outlet port;

a first set of seals positioned between the first outer spindle and the main shaft for maintaining isolation between each of a first portion of the plurality of signals;

a second outer spindle affixed to the mounting structure, the second outer spindle attached opposite the first outer spindle, the second outer spindle having a plurality of second spindle ports for transferring a second portion of the plurality signals to the mounting structure, each second spindle port in communication with at least one shaft outlet port; and a second set of seals positioned between the second outer spindle and the main shaft for maintaining isolation between each of a second portion of the plurality of signals.

14. The manifold of claim 13 wherein the plurality of locations includes a first set of locations which is positioned above the mounting structure and a second set of locations which is position below the mounting structure.

15. The manifold of claim 13 wherein the plurality of signals are each independent air pressure signals.

16. The manifold of claim 13 wherein the plurality of signals include at least eight separate signals.

17. The manifold of claim 13 wherein the mounting structure is a rotatable turret.

18. The manifold of claim 17 further comprising a plurality of nozzles attached to the rotatable turret, each nozzle for receiving one of the plurality of signals.

19. The manifold of claim 13 wherein each shaft outlet port and a respective first spindle port or second spindle port are aligned in an opening of the first seal set or the second seal set.

20. The manifold of claim 13 wherein further comprising a first bearing attached between the shaft and the first outer spindle, and a second bearing attached between the main shaft and the second outer spindle.

21. The manifold of claim 13 wherein the plurality of signals are pneumatic signals.

22. A balanced rotary manifold for handling a plurality of control signals so as to allow the control signals such that the signals are transmitted from a stationary fixture to a rotatable mounting structure, the air manifold comprising:

a main shaft attached to the housing, the main shaft having a substantially cylindrical outer surface and an end surface being substantially perpendicular to the substantially cylindrical outer surface, the end surface having a plurality of shaft inlet ports for receiving the plurality of control signals and the substantially cylindrical outer surface having a plurality of shaft outlet ports for presenting the plurality of control signals to a plurality of predetermined locations, the shaft inlet ports and the shaft outlet ports configured such that a single inlet port is in communication with a single outlet port via a bore hole;

a mounting structure rotatably associated with the main shaft;

a first set of seals positioned adjacent the cylindrical outer surface of the main shaft for maintaining isolation between each of a first portion of the plurality of control signals;

a first outer spindle affixed to the mounting structure and positioned adjacent the first set of seals, the first outer spindle having a plurality of first spindle ports for transferring the first portion of the plurality of control signals to the mounting structure, each first spindle port in communication with a single shaft outlet port;

a second set of seals positioned adjacent the cylindrical outer surface of the main shaft for maintaining isolation between each of a second portion of the plurality of signals; and a second outer spindle affixed to the mounting structure and positioned adjacent the second set of seals, the second outer spindle attached opposite the first outer spindle, the second outer spindle having a plurality of second spindle ports for transferring a second portion of the plurality signals to the mounting structure, each second spindle port in communication with a single shaft outlet port.

23. The manifold of claim 22 wherein the plurality of signals are pneumatic signals.

* * * * *